United States Patent
Ackermann et al.

(10) Patent No.: US 10,009,966 B2
(45) Date of Patent: Jun. 26, 2018

(54) TRANSFORMER FOR PROVIDING FEEDING AND DATA SIGNALS

(71) Applicant: PHILIPS LIGHTING HOLDING B.V., Eindhoven (NL)

(72) Inventors: Bernd Ackermann, Eindhoven (NL); Theodorus Johannes Petrus Van Den Biggelaar, Eindhoven (NL); Dirk Fieberg, Eindhoven (NL); Brian Roberge, Eindhoven (NL); Eberhard Waffenschmidt, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 136 days.

(21) Appl. No.: 15/117,666

(22) PCT Filed: Feb. 4, 2015

(86) PCT No.: PCT/EP2015/052226
§ 371 (c)(1),
(2) Date: Aug. 9, 2016

(87) PCT Pub. No.: WO2015/121113
PCT Pub. Date: Aug. 20, 2015

(65) Prior Publication Data
US 2016/0360581 A1    Dec. 8, 2016

Related U.S. Application Data

(60) Provisional application No. 61/939,812, filed on Feb. 14, 2014.

(51) Int. Cl.
*H01F 27/29* (2006.01)
*H05B 33/08* (2006.01)
(Continued)

(52) U.S. Cl.
CPC ......... *H05B 33/0809* (2013.01); *H01F 27/29* (2013.01); *H01F 38/14* (2013.01);
(Continued)

(58) Field of Classification Search
CPC .. H04B 5/0037; H04B 5/0031; H04B 5/0087; H04L 25/0266; H01F 27/29; H01F 38/14; H05B 33/0809; H02J 5/80; H02J 50/10
See application file for complete search history.

(56) References Cited

U.S. PATENT DOCUMENTS

| | | |
|---|---|---|
| 4,758,836 A | 7/1988 | Scuilli |
| 2009/0185658 A1 | 7/2009 | Katcha et al. |
| 2013/0082516 A1 | 4/2013 | Yamaguchi |

FOREIGN PATENT DOCUMENTS

| | | |
|---|---|---|
| EP | 0637877 B1 | 12/2001 |
| GB | 2095493 A | 9/1982 |
| NL | 9000685 A | 10/1991 |

*Primary Examiner* — Robert Deberadinis

(57) ABSTRACT

Transformers (1) comprise primary parts and secondary parts with first and second taps (11, 12) for providing feeding signals to combinations of switching circuits (22, 26) and loads (21) and with third and fourth taps (13, 14) for providing data signals to receivers (23). At least one of the third and fourth taps (13, 14) is different from the first and second taps (11, 12). In that case, the data signals will be better available, even in case the first and second taps (11, 12) are short-circuited. The primary parts may comprise primary windings (15), the secondary parts may comprise secondary windings (16). The first to fourth taps (11-14) may be taps of the secondary windings (16). The first and third taps (11, 13) may be identical taps, and the second and fourth taps (12, 14) may be different taps. The first and second taps (11, 12) may be outer taps and the fourth taps may be center taps.

15 Claims, 5 Drawing Sheets

(51) Int. Cl.
*H04B 5/00* (2006.01)
*H04L 25/02* (2006.01)
*H02J 50/80* (2016.01)
*H02J 50/10* (2016.01)
*H01F 38/14* (2006.01)

(52) U.S. Cl.
CPC .............. *H02J 50/10* (2016.02); *H02J 50/80* (2016.02); *H04B 5/0031* (2013.01); *H04B 5/0037* (2013.01); *H04B 5/0087* (2013.01); *H04L 25/0266* (2013.01)

TRANSFORMER FOR PROVIDING FEEDING AND DATA SIGNALS

CROSS-REFERENCE TO PRIOR APPLICATIONS

This application is the U.S. National Phase application under 35 U.S.C. § 371 of International Application No. PCT/EP2015/052226, filed on Feb. 4, 2015, which claims the benefit of European Patent Application No. 14164093.8, filed on Apr. 9, 2014 and U.S. Provisional Application No. 61/939,812, filed on Feb. 14, 2014. These applications are hereby incorporated by reference herein.

FIELD OF THE INVENTION

The invention relates to a transformer comprising primary and secondary parts. The invention further relates to an interface comprising a transformer, to a load and to a system. Examples of such a load are lamps. Examples of such a system are transformers coupled to cables, and interfaces coupled to cables.

BACKGROUND OF THE INVENTION

EP 0 637 877 B1 discloses a device for a contactless transfer of power and data. This is done in a relatively complex way through two power coils and through two data coils.

SUMMARY OF THE INVENTION

It is an object of the invention to provide a transformer for providing feeding and data signals. It is a further object of the invention to provide an interface, a load and a system.

According to a first aspect, a transformer is provided comprising primary and secondary parts, the secondary part comprising first and second taps for providing a feeding signal to a combination of a switching circuit and a load, and third and fourth taps for providing a data signal to a receiver, at least one of the third and fourth taps being different from the first and second taps.

The transformer comprises a primary part and a secondary part. The secondary part comprises first and second taps for providing a feeding signal to a combination of a switching circuit and a load. The secondary part further comprises third and fourth taps for providing a data signal to a receiver. At least one of the third and fourth taps is different from the first and second taps.

Compared to the relatively complex prior art contactless transfer of power and data through two power coils and through two data coils, the transformer introduces a relatively simple transfer of power and data, which is a great improvement.

An additional advantage is that, as long as at least one of the third and fourth taps is different from the first and second taps, the data signal will be better available, for example even in case the first and second taps are short-circuited.

A first combination of a switching circuit and a load may be a parallel combination of a switch and a load configured to be coupled to the first and second taps. A second combination of a switching circuit and a load may comprise a switch, a rectifier bridge and a load, with electrodes of the switch being configured to be coupled to the first and second taps and being coupled to input electrodes of the rectifier bridge, and with output electrodes of the rectifier bridge being coupled to the load. A third combination of a switching circuit and a load may comprise a rectifier bridge, a switch, a diode and a load, with input electrodes of the rectifier bridge being configured to be coupled to the first and second taps, with output electrodes of the rectifier bridge being coupled to first and second electrodes of the switch, and with the first electrode of the switch being coupled to a first electrode of the load via the diode and with the second electrode of the switch being coupled to a second electrode of the load. A fourth combination of a switching circuit and a load may comprise first and second switches, first and second diodes and a load, with first electrodes of the first diode and the first switch being configured to be coupled to the first tap, with first electrodes of the second diode and the second switch being configured to be coupled to the second tap, with second electrodes of the first and second diodes being coupled to a first electrode of the load and with second electrodes of the first and second switches being coupled to a second electrode of the load. A fifth combination of a switching circuit and a load may comprise first and second switches, first and second diodes and a load, with first electrodes of the first and second diodes being configured to be coupled to the first tap, with first electrodes of the first and second switches being configured to be coupled to the second tap, with second electrodes of the first diode and the first switch being coupled to a first electrode of the load and with second electrodes of the second diode and the second switch being coupled to a second electrode of the load. Other combinations are not to be excluded. And further elements may be present, coupled serially or in parallel to one or more of the switches, one or more of the diodes and/or the load, such as for example a capacitor coupled in parallel to the load for smoothing purposes etc.

An embodiment of the transformer is defined by the primary part comprising one primary winding, the secondary part comprising one secondary winding, the first, second, third and fourth taps being taps of the secondary winding. Preferably, the primary part comprises (only) one primary winding, and the secondary part comprises (only) one secondary winding. The first, second, third and fourth taps are taps of the secondary winding.

An embodiment of the transformer is defined by the first and third taps being identical taps, the second and fourth taps being different taps. This transformer has (only) three different taps at the secondary part.

An embodiment of the transformer is defined by the fourth tap being situated between the first and second taps. This fourth tap is an intermediate tap located somewhere between the first and second taps.

An embodiment of the transformer is defined by the first and second taps being outer taps and the fourth tap being a center tap. These first and second taps are outer taps and this fourth tap is a center tap located in the middle of the outer taps.

An embodiment of the transformer is defined by the primary and secondary parts being galvanically isolated. This transformer provides galvanic isolation.

According to a second aspect, an interface is provided for interfacing a cable and a load, the interface comprising the transformer as defined above, the primary part being configured to be coupled to the cable.

An embodiment of the interface is defined by further comprising the switching circuit coupled to at least one of the first and second taps and being configured to be coupled to the load. The switching circuit is coupled to at least one of the first and second taps and is configured to be coupled to the load, whereby a rectifier bridge, one or more diodes and a capacitor may be present too, as described above at the hand of the first to fifth combinations.

An embodiment of the interface is defined by further comprising the receiver coupled to the third and fourth taps, the receiver being configured to control the switching circuit. As long as at least one of the third and fourth taps is different from the first and second taps, the data signal will be better available, and the receiver can control the switching circuit independently from a mode of the switching circuit.

An embodiment of the interface is defined by the receiver being coupled to the third tap via a first capacitor and to the fourth tap via a second capacitor. The first and second capacitors block the relatively low frequency feeding signal (for example 1 kHz or 10 kHz or 100 kHz respectively) and let the relatively high frequency data signal (for example 10 kHz or 100 kHz or 1 MHz respectively) pass.

An embodiment of the interface is defined by the primary part comprising one primary winding, the secondary part comprising one secondary winding, the first, second, third and fourth taps being taps of the secondary winding.

An embodiment of the interface is defined by the first and third taps being identical taps, the second and fourth taps being different taps.

According to a third aspect, a load is provided comprising the transformer as defined above or comprising the interface as defined above.

An embodiment of the load is defined by further comprising a light emitting diode circuit. A light emitting diode circuit comprises one or more light emitting diodes of whatever kind and in whatever combination.

According to a fourth aspect, a system is provided comprising the interface as defined above and further comprising the cable.

An embodiment of the system is defined by further comprising a driver coupled to the cable.

An insight is that a feeding signal and a data signal can be provided via a transformer. A basic idea is that first and second taps may provide a feeding signal to a combination of a switching circuit and a load and that third and fourth taps may provide a data signal to a receiver, whereby at least one of the third and fourth taps should be different from the first and second taps.

A problem to provide a transformer has been solved. A further advantage is that the data signal will be better available, and that the receiver can control the switching circuit independently from a mode of the switching circuit.

These and other aspects of the invention will be apparent from and elucidated with reference to the embodiments described hereinafter.

DETAILED DESCRIPTION OF EMBODIMENTS

Figure 1:
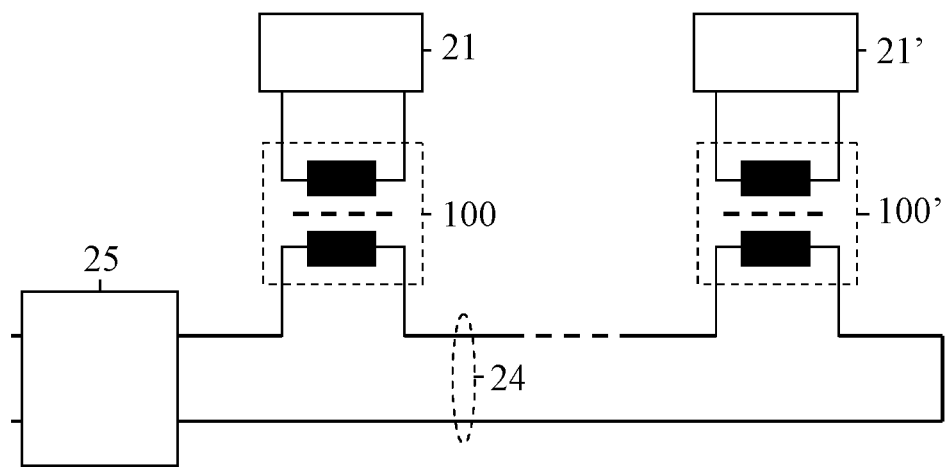
FIG. 1 shows a prior art system.

In the FIG. 1, a prior art system is shown. The prior art system comprises a driver 25 coupled to first ends of conductors of a cable 24. A primary part such as for example a primary winding of a transformer 100 is coupled to the cable 24, and a secondary part such as for example a secondary winding of the transformer 100 is coupled to a load 21 that for example comprises a light emitting diode circuit. A primary part such as for example a primary winding of a transformer 100' is coupled to the cable 24, and a secondary part such as for example a secondary winding of the transformer 100' is coupled to a load 21' that for example comprises a light emitting diode circuit. The primary parts each interrupt one of the conductors of the cable 24 at different locations and are therefore serially coupled. Second ends of the conductors of the cable 24 are interconnected. Other couplings and other connections are not to be excluded. In a minimum situation, there may be one driver 25, one cable 24, one transformer 100 and one load 21. In an extended situation, there may be more drivers and/or more than one cable per driver and/or more than one transformer per cable and/or more than one load per transformer.

Figure 2:
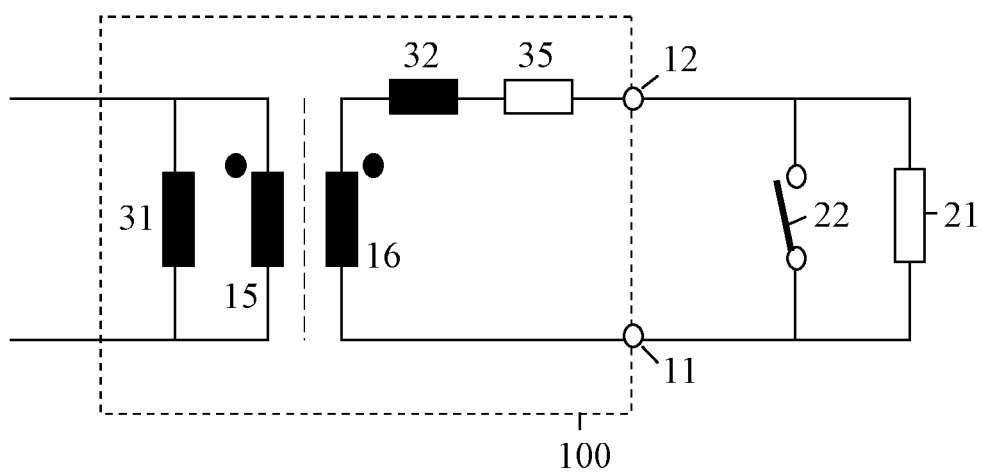
FIG. 2 shows a prior art transformer and a first combination of a switching circuit and a load.

In the FIG. 2, a prior art transformer 100 and a first combination of a switching circuit 22 and a load 21 are shown. The transformer 100 comprises primary and secondary parts. The primary part comprises for example one primary winding 15, and the secondary part comprises for example one secondary winding 16. The secondary part comprises first and second taps 11, 12 for providing a feeding signal to a combination of a switching circuit 22 and a load 21. The primary and secondary parts may provide galvanic isolation. The switching circuit 22 here comprises one switch.

Owing to the fact that the primary winding 15, the secondary winding 16 and their inductive coupling may not be ideal, further shown are a virtual induction 31 coupled in parallel to the primary winding 15, and a serial combination of a virtual induction 32 and a virtual resistance 35 coupled serially to one side of the secondary winding 16.

The switching circuit 22 is coupled to the load 21 in parallel such that, for the switching circuit 22 being in a relatively high impedance mode, power is provided to the load 21 via the feeding signal such as for example a feeding voltage or a feeding current provided via the first and second taps 11, 12. For the switching circuit 22 being in a relatively low impedance mode, less power or no power at all is provided to the load 21. A data signal such as for example a data voltage provided via the first and second taps 11, 12 is only available as long as the switching circuit 22 is in the relatively high impedance mode. As soon as the switching circuit 22 has gone into the relatively low impedance mode, in this prior art situation the data signal is no longer available, owing to the fact that the first and second taps 11, 12 have been short-circuited.

Figure 3:
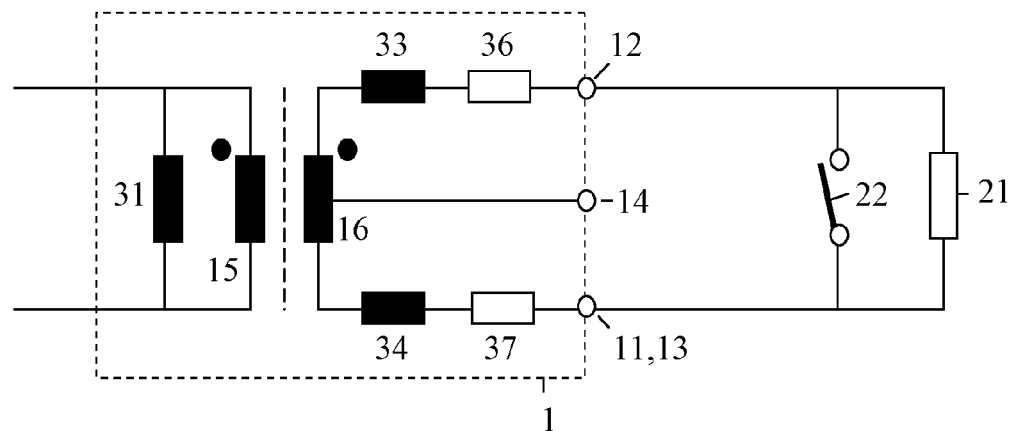
FIG. 3 shows an embodiment of a transformer and a first combination of a switching circuit and a load.

In the FIG. 3, an embodiment of a transformer 1 and a first combination of a switching circuit 22 and a load 21 are shown. The transformer 1 comprises primary and secondary parts. The primary part comprises for example one primary winding 15, and the secondary part comprises for example one secondary winding 16. The secondary part comprises first and second taps 11, 12 for providing a feeding signal to a combination of a switching circuit 22 and a load 21. The secondary part further comprises third and fourth taps 13, 14 for providing a data signal to a receiver 23 not shown here but further discussed at the hand of the FIG. 4.

Owing to the fact that the primary winding 15, the secondary winding 16 and their inductive coupling may not be ideal, further shown are a virtual induction 31 coupled in parallel to the primary winding 15, and a first serial combination of a virtual induction 33 and a virtual resistance 36 coupled serially to a first side of the secondary winding 16, and a second serial combination of a virtual induction 34 and a virtual resistance 37 coupled serially to a second side of the secondary winding 16.

The first, second, third and fourth taps 11-14 are taps of the secondary winding 16. At least one of the third and fourth taps 13, 14 is different from the first and second taps 11, 12. As a result, a data signal such as for example a data voltage provided via the third and fourth taps 13, 14 is now better available, such as available during an increased amount of time, and independently from a mode of the switching circuit 22.

The first and third taps 11, 13 may for example be identical taps, and the second and fourth taps 12, 14 may for example be different taps. The fourth tap 14 may for example be situated between the first and second taps 11, 12. The first and second taps 11, 12 may be outer taps and the fourth tap 14 may be a center tap. In this case, the values of the virtual inductions 33, 34 may be identical and equal to half a value of the virtual induction 32. Similarly, the values of the virtual resistances 36, 37 may then be identical and equal to half a value of the virtual resistance 35.

Alternatively, the first and second taps 11, 12 may be outer taps, and the third and fourth taps 13, 14 may be (different) intermediate taps. Alternatively, the first and fourth taps 11, 14 may be outer taps, and the second tap 12 may be an intermediate tap etc. Alternatively, the first and fourth taps 11, 14 may be outer taps, and the second and third taps 12, 13 may be (different) intermediate taps etc. Alternatively, the second and fourth taps 12, 14 may be outer taps, and the first tap 11 may be an intermediate tap etc. Alternatively, the second and fourth taps 12, 14 may be outer taps, and the first and third taps 11, 13 may be (different) intermediate taps etc. Generally, each one of the first to fourth taps 11-14 may have an arbitrary location in the secondary part, as long as (a location of) at least one of the third and fourth taps 13, 14 is different from (locations of) the first and second taps 11, 12.

Figure 4:
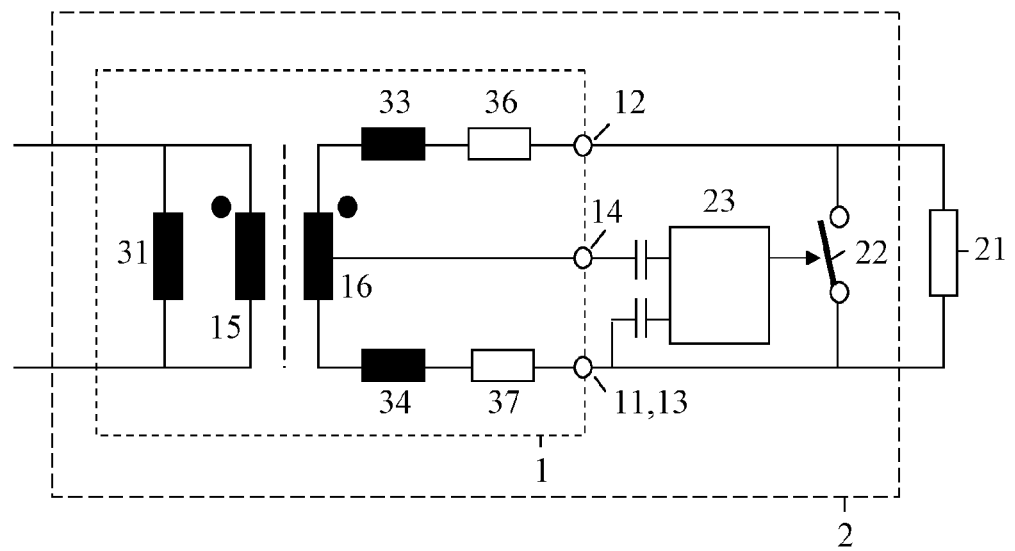
FIG. 4 shows an embodiment of an interface.

In the FIG. 4, an embodiment of an interface 2 is shown. The interface 2 comprises the transformer 1 shown in and discussed at the hand of the FIG. 3. The interface 2 may further comprise the switching circuit 22 and may further comprise the receiver 23 for controlling the switching circuit 22. A first input of the receiver 23 is coupled to the third tap 13 such as for example the first tap 11, possibly via a first capacitor, and a second input of the receiver 23 is coupled to the fourth tap 14, possibly via a second capacitor. The receiver 23 may for example comprise an amplifier with inputs coupled to the third and fourth taps 13, 14 and with outputs coupled to inputs of a control unit for controlling the switching circuit 22. Said control may for example comprise a control of power provided to a load 21 in the form of a lamp, without having excluded other kinds of controls and other kinds of loads. One or more couplings (not shown) between the receiver 23 and the load 21 may be present for one or more other kinds of controls, such as for example a control of a color and a control of an intensity of the load 21 when in the form of the lamp.

Figure 5:
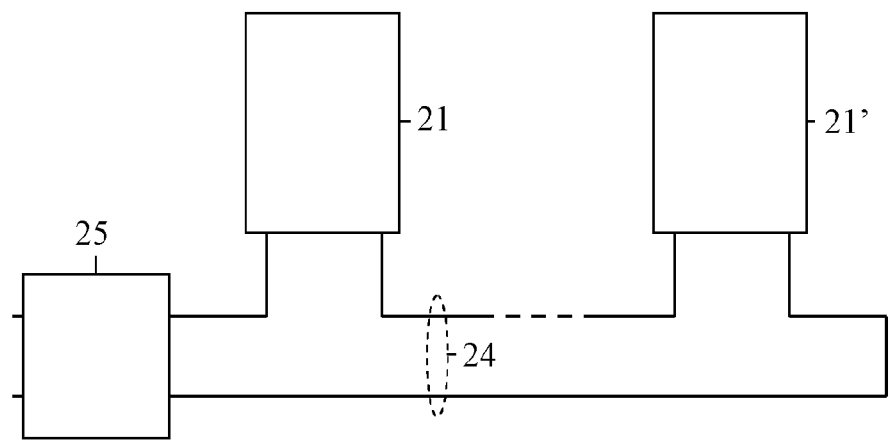
FIG. 5 shows a system.

In the FIG. 5, a system is shown. This system comprises a driver 25 coupled to first ends of conductors of a cable 24. A load 21 is coupled to the cable 24, and a load 21' is coupled to the cable 24. The loads 21, 21' each interrupt one of the conductors of the cable 24 at different locations and are therefore serially coupled. Second ends of the conductors of the cable 24 are interconnected. Other couplings and other connections are not to be excluded. The loads 21, 21' each comprise a transformer 1 (not shown here) and may then further each comprise a switching circuit 22 (not shown here) and/or a receiver 23 (not shown here). Alternatively, the loads 21, 21' may each comprise an interface 2 (not shown here) and may then further each comprise—if not already present in the interface 2—a switching circuit 22 (not shown here) and/or a receiver 23 (not shown here). In a minimum situation, there may be one driver 25, one cable 24 and one load 21. In an extended situation, there may be more drivers and/or more than one cable per driver and/or more than one load per cable.

Figure 6:
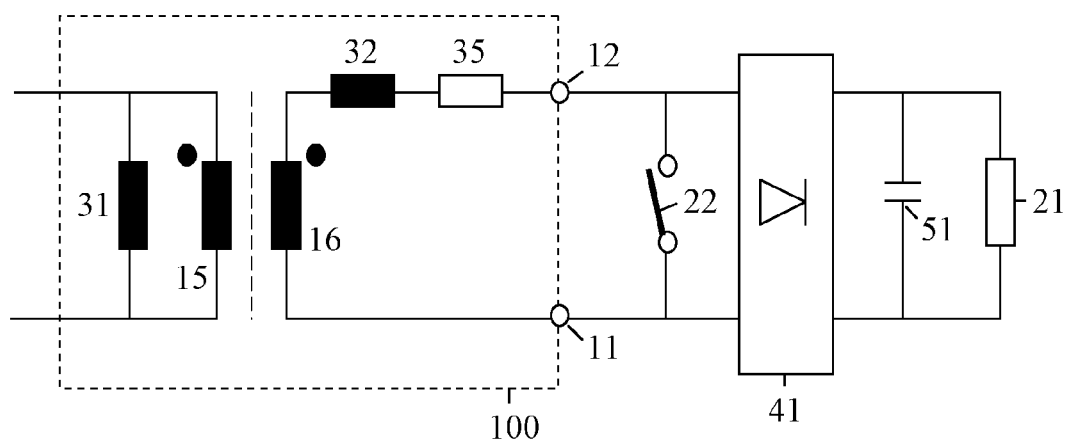
FIG. 6 shows a prior art transformer and a second combination of a switching circuit and a load.

In the FIG. 6, a prior art transformer 100 and a second combination of a switching circuit 22 and a load 21 are shown. The second combination may comprise a switch 22, a rectifier bridge 41 and a load 21, with electrodes of the switch 22 being coupled to the first and second taps 11, 12 and being coupled to input electrodes of the rectifier bridge 41, and with output electrodes of the rectifier bridge 41 being coupled to the load 21. In parallel to the load 21, a capacitor 51 is present for smoothing purposes.

Figure 7:
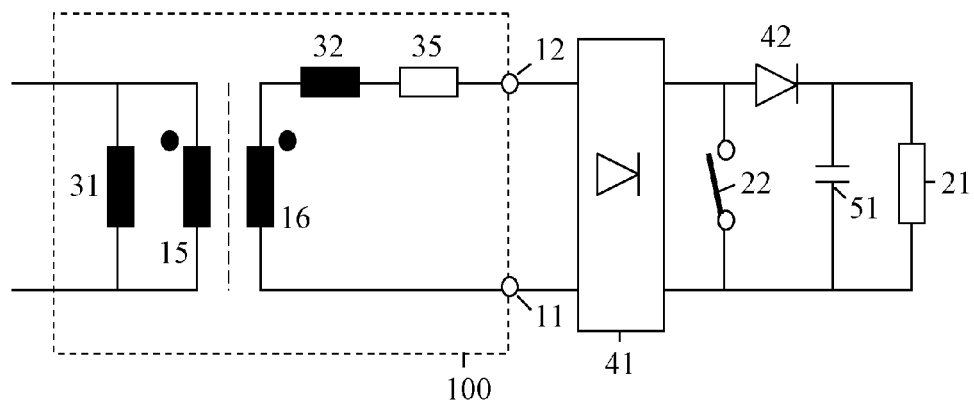
FIG. 7 shows a prior art transformer and a third combination of a switching circuit and a load.

In the FIG. 7, a prior art transformer 100 and a third combination of a switching circuit 22 and a load 21 are shown. The third combination may comprise a rectifier bridge 41, a switch 22, a diode 42 and a load 21, with input electrodes of the rectifier bridge 41 being coupled to the first and second taps 11, 12, with output electrodes of the rectifier bridge 41 being coupled to first and second electrodes of the switch 22, and with the first electrode of the switch 22 being coupled to a first electrode of the load 21 via the diode 42 and with the second electrode of the switch 22 being coupled to a second electrode of the load 21. In parallel to the load 21, a capacitor 51 is present for smoothing purposes. The diode 42 prevents an unwanted discharging of the capacitor 51 via the switch 22.

Figure 8:
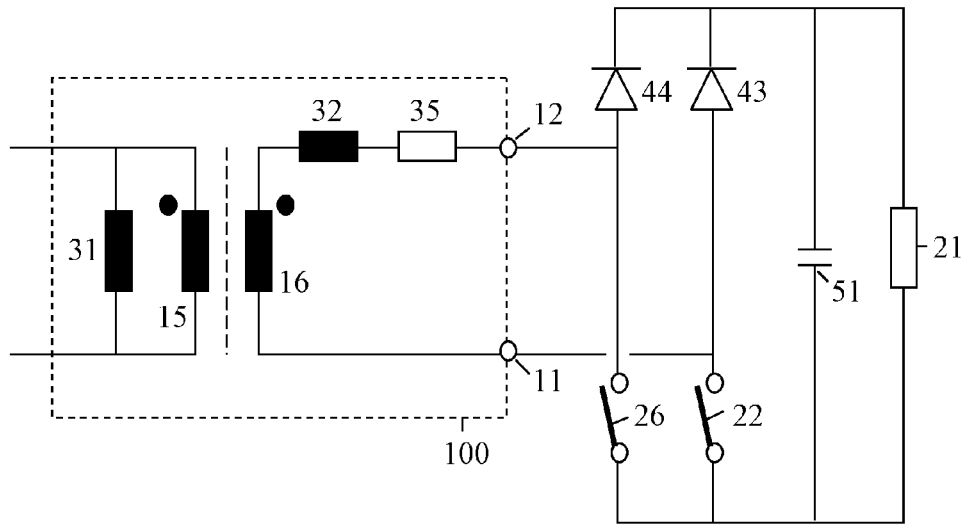
FIG. 8 shows a prior art transformer and a fourth combination of a switching circuit and a load.

In the FIG. 8, a prior art transformer 100 and a fourth combination of a switching circuit 22, 26 and a load 21 are shown. The fourth combination may comprise first and second switches 22, 26, first and second diodes 43, 44 and a load 21, with first electrodes of the first diode 43 and the first switch 22 being coupled to the first tap 11, with first electrodes of the second diode 44 and the second switch 26 being coupled to the second tap 12, with second electrodes of the first and second diodes 43, 44 being coupled to a first electrode of the load 21 and with second electrodes of the first and second switches 22, 26 being coupled to a second electrode of the load 21. In parallel to the load 21, a capacitor 51 is present for smoothing purposes. Compared to the second and third combinations with the rectifier bridge 41, the fourth combination shows reduced losses. The switching circuit 22, 26 here comprises two switches 22, 26.

Figure 9:
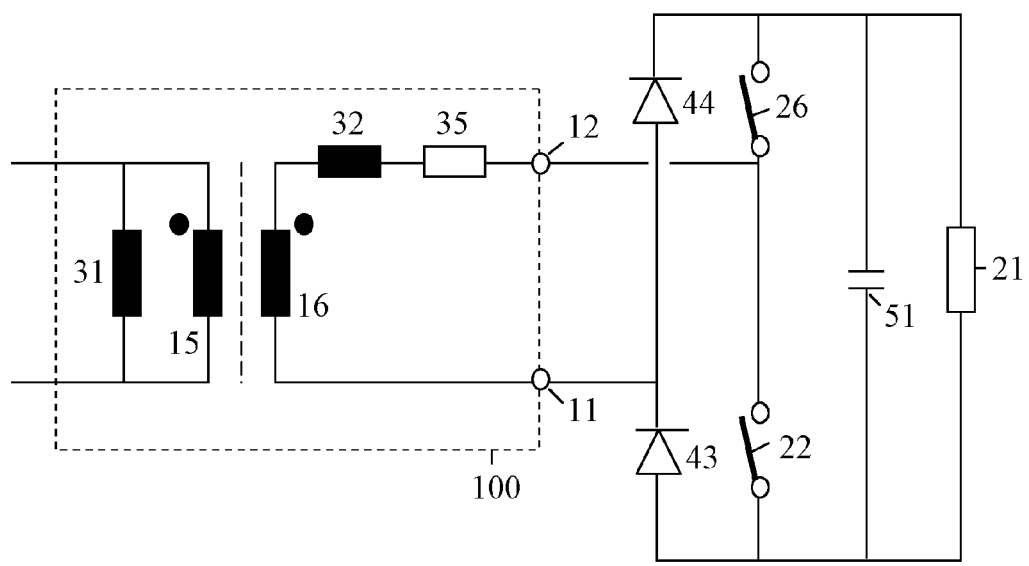
FIG. 9 shows a prior art transformer and a fifth combination of a switching circuit and a load.

In the FIG. 9, a prior art transformer 100 and a fifth combination of a switching circuit 22, 26 and a load 21 are shown. The fifth combination may comprise first and second switches 22, 26, first and second diodes 43, 44 and a load 21, with first electrodes of the first and second diodes 43, 44 being coupled to the first tap 11, with first electrodes of the first and second switches 22, 26 being coupled to the second tap 12, with second electrodes of the first diode 43 and the first switch 22 being coupled to a first electrode of the load 21 and with second electrodes of the second diode 44 and the second switch 26 being coupled to a second electrode of the load 21. In parallel to the load 21, a capacitor 51 is present for smoothing purposes. In the fifth combination, the first and second switches 22, 26 need to be operated in an anti-phase way, to prevent an unwanted discharging of the capacitor 51 via the first and second switches 22, 26. The switching circuit 22, 26 here comprises two switches 22, 26.

Each one of the second to fifth combinations may be introduced into the FIGS. 3 and 4. In case of two switches 22, 26 being present that may need separate controls, the receiver 23 may need to be given an additional output etc. Other combinations are not to be excluded. And further elements may be present, coupled serially or in parallel to one or more of the switches 22, 26, the rectifier bridge 41, one or more of the diodes 42-44 and/or the load 21 etc. The capacitor 51 is optional. More than two switches 22, 26 may be possible too. First and second elements may be coupled directly without a third element being in between or may be coupled indirectly via a third element. Further elements may be present in the transformer 1 and in the interface 2, such as for example one or more capacitors for blocking DC-components etc.

Summarizing, transformers 1 comprise primary parts and secondary parts with first and second taps 11, 12 for providing feeding signals to combinations of switching circuits 22, 26 and loads 21 and with third and fourth taps 13, 14 for providing data signals to receivers 23. At least one of the third and fourth taps 13, 14 is different from the first and second taps 11, 12. In that case, the data signals will be better available, even in case the first and second taps 11, 12 are short-circuited. The primary parts may comprise primary windings 15, the secondary parts may comprise secondary windings 16. The first to fourth taps 11-14 may be taps of the secondary windings 16. The first and third taps 11, 13 may be identical taps, and the second and fourth taps 12, 14 may be different taps. The first and second taps 11, 12 may be outer taps and the fourth taps may be center taps.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A transformer comprising primary and secondary parts, the secondary part comprising
   first and second taps for providing power to a combination of a switching circuit and a load via a feeding signal, and
   third and fourth taps for providing a data signal to a receiver that controls the switching circuit, at least one of the third and fourth taps being different from the first and second taps.

2. The transformer as defined in claim 1, the primary part comprising one primary winding, the secondary part comprising one secondary winding, the first, second, third and fourth taps being taps of the secondary winding.

3. The transformer as defined in claim 1, the first and third taps being identical taps, the second and fourth taps being different taps.

4. The transformer as defined in claim 3, the fourth tap being situated between the first and second taps.

5. The transformer as defined in claim 4, the first and second taps being outer taps and the fourth tap being a center tap.

6. The transformer as defined in claim 1, the primary and secondary parts being galvanically isolated.

7. An interface for interfacing a cable and a load, the interface comprising the transformer as defined in claim 1, the primary part being configured to be coupled to a cable.

8. The interface as defined in claim 7, further comprising the switching circuit coupled to at least one of the first and second taps and being configured to be coupled to the load.

9. The interface as defined in claim 7, further comprising the receiver coupled to the third and fourth taps, the receiver being configured to control the switching circuit.

10. The interface as defined in claim 9, the receiver being coupled to the third tap via a first capacitor and to the fourth tap via a second capacitor.

11. The interface as defined in claim 7, the primary part comprising one primary winding, the secondary part comprising one secondary winding, the first, second, third and fourth taps being taps of the secondary winding.

12. A load comprising the transformer as defined in claim 1 and further comprising the interface as defined in claim 7.

13. The load as defined in claim 12, further comprising a light emitting diode circuit.

14. A system comprising the interface as defined in claim 7 and further comprising the cable.

15. The system as defined in claim 14, further comprising a driver coupled to the cable.

* * * * *